United States Patent
Rich

(10) Patent No.: US 11,603,112 B2
(45) Date of Patent: Mar. 14, 2023

(54) ADAPTABLE DRIVE MODE SYSTEMS AND METHODS

(71) Applicant: TOYOTA MOTOR ENGINEERING & MANUFACTURING NORTH AMERICA, INC., Plano, TX (US)

(72) Inventor: Daniel H. Rich, Torrance, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 502 days.

(21) Appl. No.: 16/656,456

(22) Filed: Oct. 17, 2019

(65) Prior Publication Data

US 2021/0114610 A1   Apr. 22, 2021

(51) Int. Cl.
*B60W 50/08* (2020.01)
*B60W 10/10* (2012.01)
*B60W 10/02* (2006.01)
*B60W 50/00* (2006.01)

(52) U.S. Cl.
CPC .......... *B60W 50/087* (2013.01); *B60W 10/02* (2013.01); *B60W 10/10* (2013.01); *B60W 2050/0095* (2013.01)

(58) Field of Classification Search
CPC .... B60W 50/087; B60W 10/02; B60W 10/10; B60W 2050/0095; B60W 2520/10; B60W 2520/105; B60W 2520/14; B60W 2520/16; B60W 2520/28; B60W 2710/0605; B60W 2710/10; B60W 2710/20; B60W 2710/22
USPC ......................................................... 701/36
See application file for complete search history.

(56) References Cited

U.S. PATENT DOCUMENTS

| | | | | |
|---|---|---|---|---|
| 5,651,749 A | * | 7/1997 | Wilson | B60K 23/0808 475/221 |
| 9,007,199 B2 | | 4/2015 | Yamada | |
| 2004/0249533 A1 | * | 12/2004 | Wheals | B60T 8/172 701/1 |
| 2005/0247495 A1 | * | 11/2005 | Tabata | B60K 6/445 180/65.235 |

(Continued)

FOREIGN PATENT DOCUMENTS

| | | |
|---|---|---|
| CN | 109693673 | 4/2019 |
| JP | 3885784 | 3/2005 |

OTHER PUBLICATIONS

"Mercedes Benz MY19 E-Class Sedan Operator Manual", Mercedes-Benz, Mar. 9, 2018.

(Continued)

*Primary Examiner* — Jonathan M Dager
*Assistant Examiner* — Jean W Charleston
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for applying an adaptive drive mode to a vehicle, including: the vehicle detecting selection of a drive mode and setting vehicle systems to correspond to the selected drive mode to place the vehicle in the selected drive mode; an adaptive drive mode circuit using vehicle sensor data to determine whether the vehicle is in a low-range mode of operation; and modifying the vehicle system settings that correspond to the selected drive mode if the vehicle is in low-range mode to adapt the vehicle system settings that correspond to the selected drive mode for the low-range mode of operation.

19 Claims, 6 Drawing Sheets

(56) References Cited

U.S. PATENT DOCUMENTS

| | | | |
|---|---|---|---|
| 2009/0102277 A1* | 4/2009 | Ezoe | B60T 7/22 |
| | | | 303/22.1 |
| 2012/0290179 A1* | 11/2012 | Oishi | B60W 30/192 |
| | | | 701/54 |
| 2018/0148064 A1* | 5/2018 | Goto | F16H 63/502 |
| 2018/0154796 A1* | 6/2018 | Kumazaki | B60K 6/547 |
| 2018/0170166 A1* | 6/2018 | Sugiyama | B60K 6/547 |
| 2019/0039450 A1* | 2/2019 | Baba | F16H 63/502 |
| 2019/0064812 A1* | 2/2019 | Melgar | B60W 10/18 |
| 2019/0241197 A1* | 8/2019 | Aizawa | B60W 40/08 |

OTHER PUBLICATIONS

"Porsche Panamera 2017-2019 Operator Manual", Panamera Manual, Porsche IManuals, 2017-2019.

* cited by examiner

ADAPTABLE DRIVE MODE SYSTEMS AND METHODS

TECHNICAL FIELD

The present disclosure relates generally to vehicle drive modes, and in particular, some implementations may relate to adaptable vehicle drive modes for certain driving conditions.

DESCRIPTION OF RELATED ART

User-selectable drive modes have become popular with contemporary vehicles. Selectable drive modes give the driver the ability to adjust vehicle settings to suit the drivers preferences or to suit particular driving situations. Many vehicles offer the ability to select from among drive modes such as, for example, SPORT MODE, SPORT+ MODE, COMFORT MODE, ECONOMY MODE, CUSTOM MODE, and so on. Selection of a mode can cause the vehicle to adjust settings for various vehicle systems such as, for example, throttle mapping, suspension stiffness, shift points, shift speed, power steering boost, ride height, and so on.

BRIEF SUMMARY OF THE DISCLOSURE

According to various embodiments of the disclosed technology adaptable driving mode systems and methods can be configured to provide greater user personalization to an ECT power button or other driving mode selection actuator. In various embodiments, the system gives a user the ability to pre-program the drive mode button to a preferred default mode (e.g., SPORT MODE, SPORT+ MODE, COMFORT MODE, ECONOMY MODE, TOWING MODE, POWER MODE, CUSTOM MODE, etc.).

In embodiments, the user may interact with the vehicle through the instrument panel or head unit to select the mode to which the actuator is programmed. For example, using touch screen inputs or steering wheel controls, the user may navigate a drive mode menu and choose to assign a given drive mode to the drive mode button. A user selection assigns the drive mode to the drive mode button such that when the button is actuated, the assigned drive mode is chosen, until changed by the driver. An indicator light can be included on the instrument panel or on the button such that when the button is active, the indicator light may indicate that the chosen drive mode is active.

In vehicles with an off-road driving mode, physical shifting of the transfer case to a low range (e.g., 4 wheel drive low mode) may alter the function of the drive mode button. When the vehicle is in this low-range mode, actuating the drive mode button activates a drive mode specific to the low-range operation. Engagement of low-range can alter the selected drive mode to tailor it more appropriately to operation in low range, or it can implement a specific mode for low-range operation. Further, the system can allow the driver to assign a mode that would be appropriate only for low-range operation, in which case the button may not be actuatable until the transfer case is put in low range.

In some embodiments, an adaptive drive-mode system for a vehicle may include: a drive mode actuator to select a drive mode; a sensor to detect vehicle settings; a processor coupled to receive data from the sensor and the drive mode actuator; and a memory coupled to the processor to store instructions, which when executed by the processor, cause the processor to perform operations, the operations including: using data from the sensor to determine whether the vehicle may be in a low-range mode of operation; and modifying a drive mode selected by the drive mode actuator to create an adapted drive mode if the vehicle may be in low-range mode to adapt vehicle settings corresponding to the selected drive mode for the low-range mode of operation.

In various embodiments the drive mode actuator may be a single-mode actuator to engage or disengage a single drive mode, were in a single drive mode assigned to the drive mode actuator may be selected by a vehicle user.

In various embodiments a drive mode assigned to the drive mode actuator may be limited to use in the low-range mode, and further In various embodiments the drive mode actuator may be actuatable only when a vehicle transfer case may be placed in the low-range mode.

In various embodiments the operations may also include applying vehicle system settings corresponding to the adapted drive mode to the vehicle and, upon sensing that the vehicle may be removed from the low-range mode, automatically reapplying vehicle system settings corresponding to the selected drive mode.

In various embodiments the vehicle system settings may be applied to adjust one or more of throttle mapping, suspension stiffness, shift points, shift speed, power steering boost and ride height.

In further embodiments, an adaptive drive-mode system for a vehicle may include: a drive mode actuator to select a drive mode; a sensor to detect vehicle environment; a processor coupled to receive data from the sensor and the drive mode actuator; and a memory coupled to the processor to store instructions, which when executed by the processor, cause the processor to perform operations, the operations comprising: using data from the sensor to determine an environmental condition in which the vehicle may be operating; and modifying a drive mode selected by the drive mode actuator to adapt vehicle settings corresponding to the selected drive mode for operation in the determined environmental condition.

In various embodiments the operations may also include applying vehicle system settings corresponding to the adapted drive mode to the vehicle.

In various embodiments the vehicle system settings are applied to adjust one or more of throttle mapping, suspension stiffness, shift points, shift speed, power steering boost and ride height.

A method for applying an adaptive drive mode to a vehicle may include: the vehicle detecting selection of a drive mode and setting vehicle systems to correspond to the selected drive mode to place the vehicle in the selected drive mode; an adaptive drive mode circuit using vehicle sensor data to determine whether the vehicle may be in a low-range mode of operation; and modifying the vehicle system settings that correspond to the selected drive mode if the vehicle may be in low-range mode to adapt the vehicle system settings that correspond to the selected drive mode for the low-range mode of operation.

In various embodiments the drive mode may be selected by a drive mode actuator that comprises a single-mode actuator to engage or disengage a single drive mode. In various embodiments a single drive mode assigned to the drive mode actuator may be selected by a vehicle user.

In various embodiments a drive mode assigned to the drive mode actuator may be limited to use in the low-range mode, and further In various embodiments the drive mode actuator may be actuatable only when a vehicle transfer case may be placed in the low-range mode.

In various embodiments the operations may also include applying vehicle system settings corresponding to the adapted drive mode to the vehicle.

In various embodiments the operations may also include upon sensing that the vehicle may be removed from the low-range mode automatically reapplying vehicle system settings corresponding to the selected drive mode.

In various embodiments the vehicle system settings are applied to adjust one or more of throttle mapping, suspension stiffness, shift points, shift speed, power steering boost and ride height.

In various embodiments the vehicle system settings are applied to adjust one or more of throttle mapping, suspension stiffness, shift points, shift speed, power steering boost and ride height.

A method for applying an adaptive drive mode to a vehicle may include: detecting selection of a drive mode and setting vehicle systems to correspond to the selected drive mode to place the vehicle in the selected drive mode; receiving sensor data; using the received sensor data from to determine an environmental condition in which the vehicle may be operating; and modifying the drive mode selected by a drive mode actuator to adapt vehicle settings corresponding to the selected drive mode for operation in the determined environmental condition.

In various embodiments the operations may also include applying vehicle system settings corresponding to the adapted drive mode to the vehicle.

In various embodiments the vehicle system settings are applied to adjust one or more of throttle mapping, suspension stiffness, shift points, shift speed, power steering boost and ride height.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide adaptable driving mode systems and methods allowing drive modes that can be configured to provide greater user personalization to a driving mode selection actuator. In various embodiments, the system gives a user the ability to pre-program the drive mode button to a preferred default mode (e.g., SPORT MODE, SPORT+ MODE, COMFORT MODE, ECONOMY MODE, TOWING MODE, POWER MODE, CUSTOM MODE, etc.).

In embodiments, a user interface allows the user to interact with the vehicle through the instrument panel, head unit, steering wheel or other input mechanism to select a mode to which the actuator is programmed. For example, using touch screen inputs or steering wheel controls, the user may navigate a drive mode menu and choose to assign a given drive mode to the drive mode button. A user selection assigns the drive mode to the drive mode button such that when the button is actuated, the assigned drive mode is chosen, until changed by the driver. In other embodiments, the drive mode actuator itself can be used to select a particular drive mode such as by implement in the drive mode actuator as, for example, a knob or dial, rolling switch, multiple button cluster, and so on. An indicator light can be included on the instrument panel or on the button to indicate that the chosen drive mode is active.

In vehicles with some level of off-road capability, physical shifting of the transfer case to a low range (e.g., 4 wheel drive low mode) may alter the function of the drive mode button. When the vehicle is in this low-range mode, actuating the drive mode button activates a drive mode specific to the low-range operation. Engagement of low-range can alter the selected drive mode to tailor it more appropriately to operation in low range, or it can implement a specific mode for low-range operation. Further, the system can allow the driver to assign a mode that would be appropriate only for low-range operation, in which case the button may not be actuatable until the transfer case is put in low range.

Figure 1:
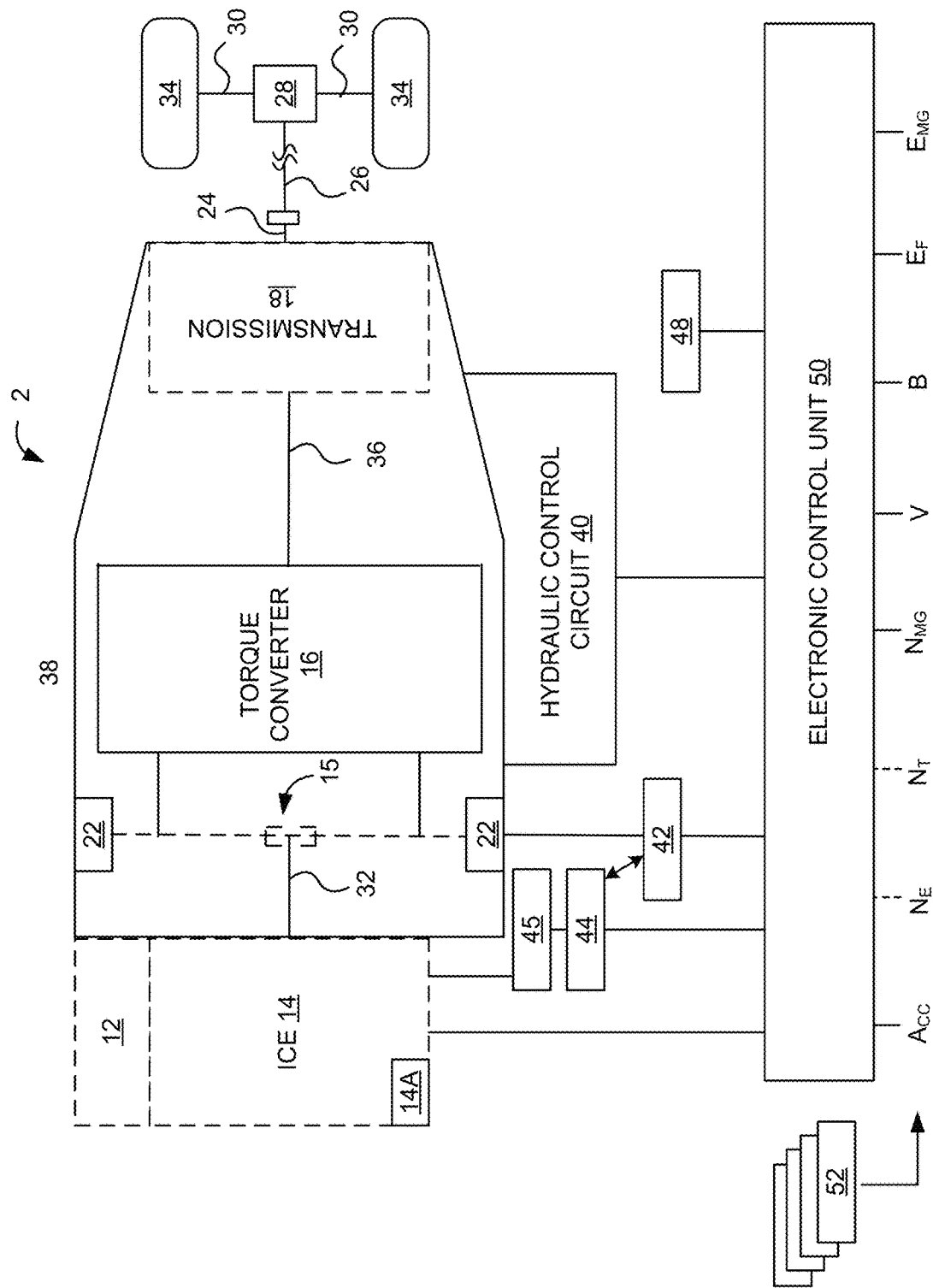
FIG. 1 is a schematic representation of an example hybrid vehicle with which embodiments of the systems and methods disclosed herein may be implemented.

The systems and methods disclosed herein may be implemented with any of a number of different vehicles and vehicle types suitable for implementation with drive modes. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for adaptable drive modes can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
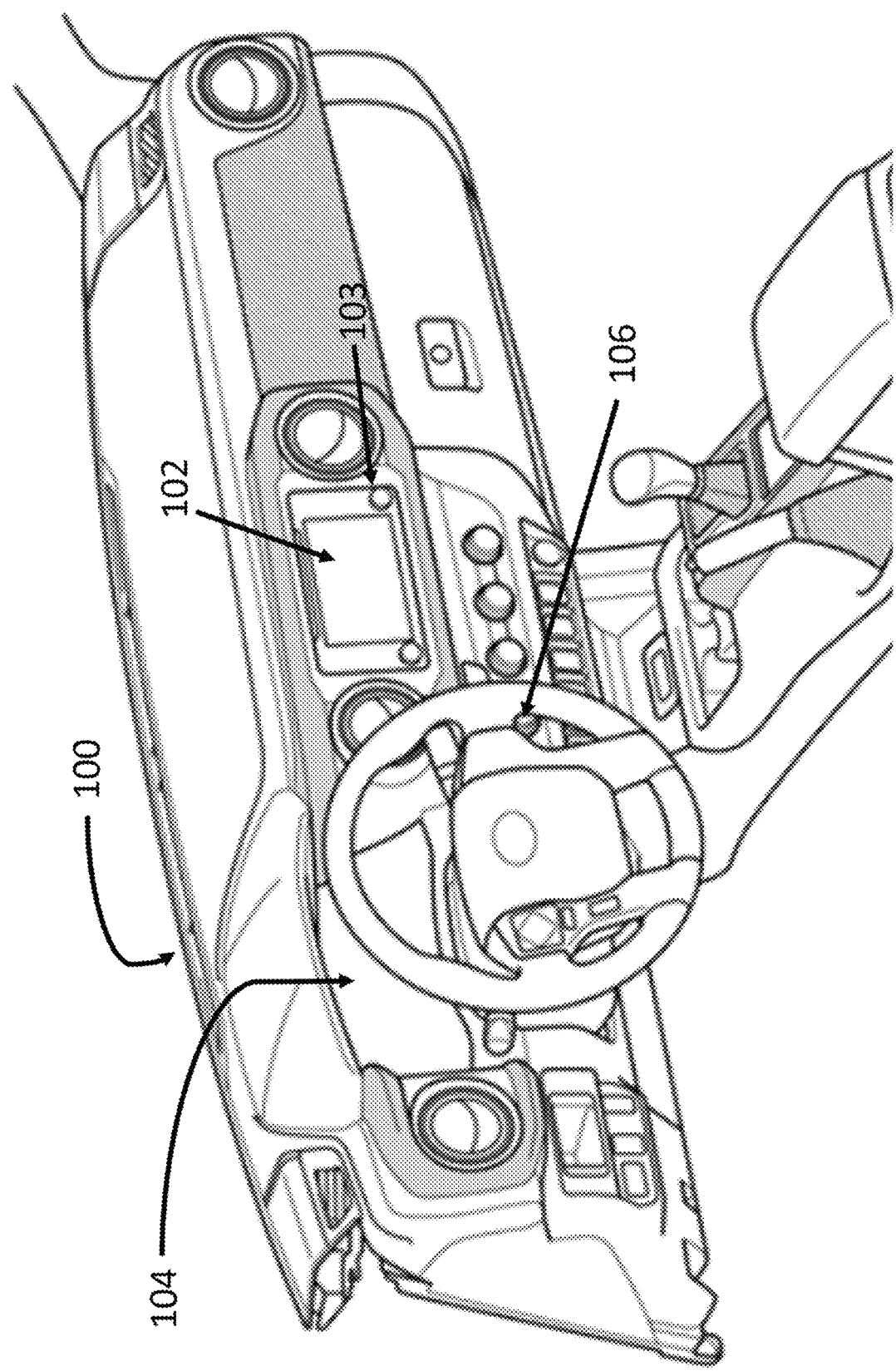
FIG. 2 illustrates an example of a vehicle dashboard with a head unit and a four-wheel-drive selector in accordance with one embodiment of the systems and methods described herein.

FIG. 2 illustrates an example dashboard of a vehicle that can include adaptable drive mode systems and methods. In this example, dashboard 100 includes a head unit 102. Depending on the vehicle configuration, head unit 102 may include a graphical user interface to allow operation of, for example, radio and other infotainment capabilities, a vehicle navigation system, and other vehicle systems. Head unit 102 can include a user interface such as a touchscreen display and one or more user input actuators. User input actuators can include, for example, buttons, knobs and switches. Instrument panel display 104 can provide another user interface that can display vehicle information to the user. In addition to or in place of interfaces 102, 104 illustrated in this example, other user interfaces can also be provided to enable vehicle occupants to adjust various vehicle settings.

In some embodiments, vehicle drive modes can be selected through user entries at user interfaces 102, 104. In some embodiments, a wheel, knob, button or other physical actuator or actuators can be included to enable the user to select the drive mode. An example of such an actuator is rotary knob 106. In this example rotary knob 106 can be used to allow the user to dial up a particular mode such as, for example, SPORT MODE, SPORT-PLUS MODE, COMFORT MODE, ECONOMY MODE, CUSTOM MODE, and so on. As another example, multiple buttons can be used to allow the user to select a desired mode. That is, each button can be assigned a mode.

Figure 3:
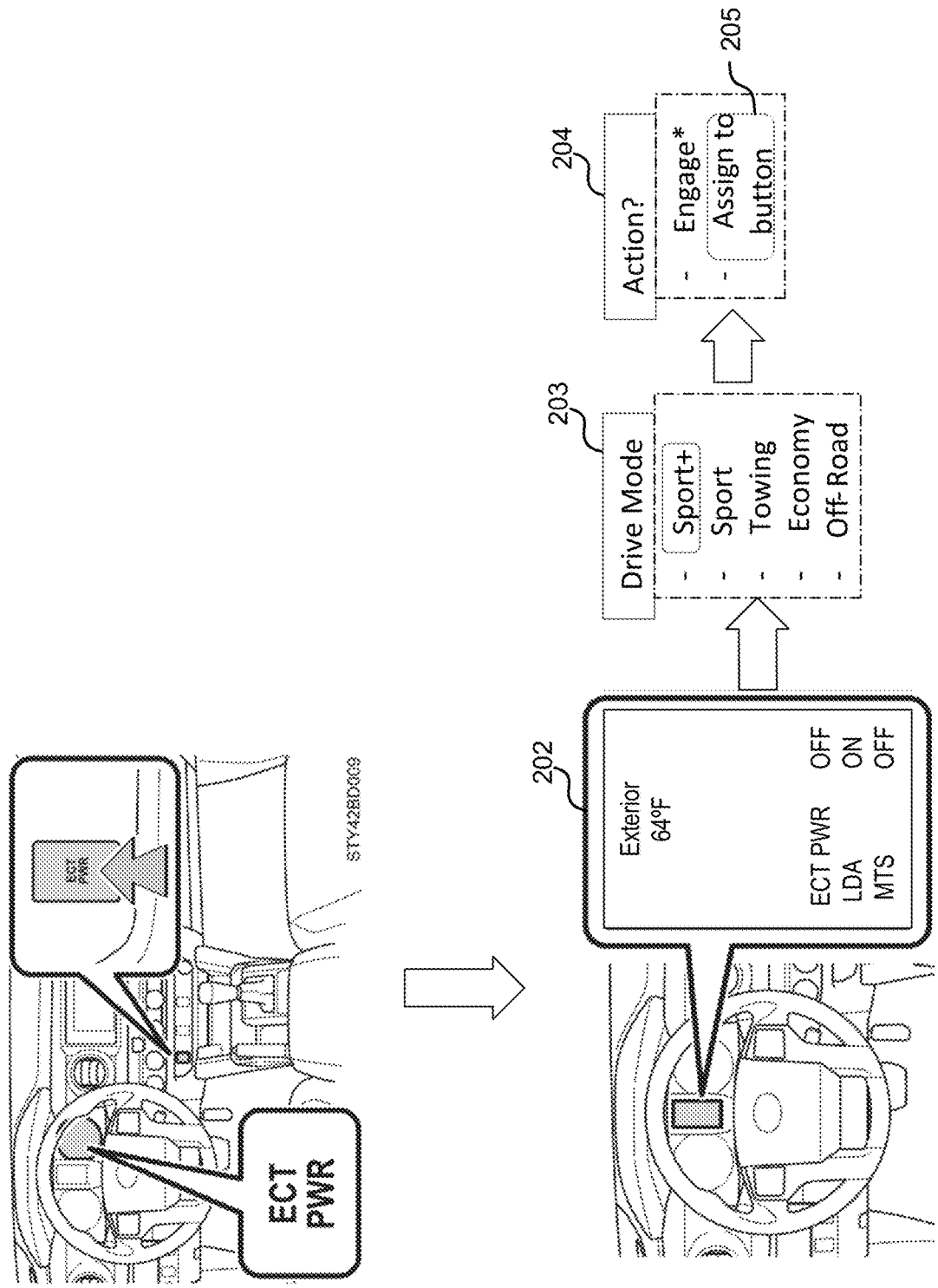
FIG. 3 illustrates an example of programming a button for a desired mode in accordance with one embodiment of the systems and methods described herein.

As yet another example a single button (or other actuator) can be provided and the desired mode programmed to that button so that the user can press the button to engage and disengage the selected mode. An example of programming a button for a desired mode is illustrated at FIG. 3.

In this example, a display 202 on the instrument panel (e.g. displays included at 102, 104) can be called up by the user. For example, steering-wheel-, stalk-, console- or dash-mounted actuators can be used to select a Drive Mode Menu. In the illustrated example the Drive Mode Menu displays a number of driving modes that can be selected or assigned to a sport mode button. This example illustrates at 203 SPORT+, SPORT, TOWING, ECONOMY AND OFF-ROAD driving modes. Alternative or additional driving modes can be included in various embodiments. As noted, the user can select the mode through an actuator. In this example, SPORT+ MODE is highlighted as selected by the vehicle operator.

This example illustrates at 204 that the system provides the user the choice to either engage the selected mode or assign the selected mode to the mode button. In this example, Assign-to-Button 205 is highlighted as being selected. Accordingly, this assigns the chosen mode (e.g., SPORT+ MODE) to the mode actuator button such that one touch engagement of the mode can be accomplished. This can improve the functioning of onboard vehicle systems as it enables one touch selection of a preprogrammed desired mode. In many conventional vehicles, the vehicle may default to a standard mode such as and ECONOMY MODE, COMFORT MODE or other standard mode when the vehicle is restarted. Rather than requiring the user to go through multiple steps to select a desired mode that he or she frequently uses, the above allows the user to program his or her preferred mode for one-step selection.

In further embodiments, an engaged drive mode can be modified based on vehicle conditions or settings or environmental/situational conditions. For example, where the vehicle is set to an extreme off-road mode such as a 4WD-LO mode (whether AWD or 4WD) the engaged drive mode can be adapted to enable the vehicle to more appropriately respond to conditions typically encountered in 4WD-LO mode and to vehicle operational parameters typically used in the 4WD-LO mode.

Figure 4:
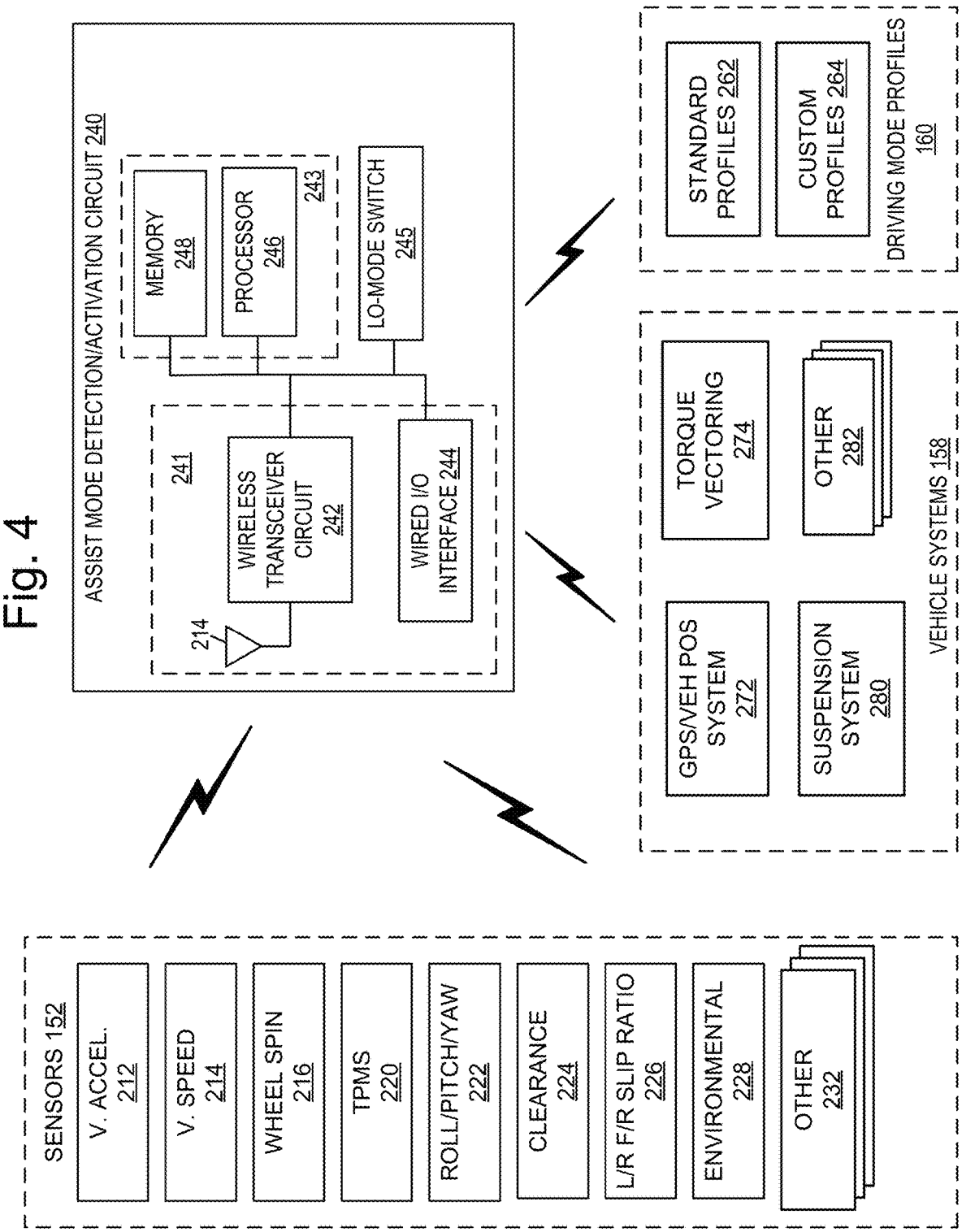
FIG. 4 illustrates an example architecture for tailoring a drive mode in accordance with one embodiment of the systems and methods described herein.

FIG. 4 illustrates an example architecture of a system for adaptive mode control in accordance with one embodiment of the systems and methods described herein. Referring now to FIG. 4, in this example, the adaptive mode control system includes an adaptive mode control circuit 210, a plurality of sensors 152, a plurality of vehicle systems 158 and stored driving mode profiles 160. Sensors 152 and vehicle systems 158 can communicate with adaptive mode control circuit 210 via a wired or wireless communication interface. Likewise, driving mode profiles 160 can be accessed through a wired or wireless interface Although sensors 152 and vehicle systems 158 are depicted as communicating with adaptive mode control circuit 210, they can also communicate with each other as well as with other vehicle systems. Adaptive mode control circuit 210 can be implemented as an ECU or as part of an ECU such as, for example electronic control unit 50. In other embodiments, adaptive mode control circuit 210 can be implemented independently of the ECU.

Adaptive mode control circuit 210 in this example includes a communication circuit 241 and a decision circuit 243 (including a processor 246 and memory 248 in this example). Components of adaptive mode control circuit 210 are illustrated as communicating with each other via a data bus, although other communication in interfaces can be included. Adaptive mode control circuit 210 in this example also includes a drive mode selection actuator 245 that can be operated by the user to select a drive mode.

Processor 246 can include one or more GPUs, CPUs, microprocessors, or any other suitable processing system. Processor 246 may include a single core or multicore processors. The memory 248 may include one or more various forms of memory or data storage (e.g., flash, RAM, etc.) that may be used to store the calibration parameters, images (analysis or historic), point parameters, instructions and variables for processor 246 as well as any other suitable information. Memory 248, can be made up of one or more modules of one or more different types of memory, and may be configured to store data and other information as well as operational instructions that may be used by the processor 246 to adaptive mode control circuit 210.

Although the example of FIG. 2 is illustrated using processor and memory circuitry, as described below with reference to circuits disclosed herein, decision circuit 243 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a adaptive mode control circuit 210.

Communication circuit 241 either or both a wireless transceiver circuit 242 with an associated antenna 214 and a wired I/O interface 244 with an associated hardwired data port (not illustrated). As this example illustrates, communications with adaptive mode control circuit 210 can include either or both wired and wireless communications circuits 241. Wireless transceiver circuit 242 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 242 and is used by wireless transceiver circuit 242 to transmit radio signals wirelessly to wireless equipment with which it is connected and to receive radio signals as well. These RF signals can include information of almost any sort that is sent or received by adaptive mode control circuit 210 to/from other entities such as sensors 152 and vehicle systems 158.

Wired I/O interface 244 can include a transmitter and a receiver (not shown) for hardwired communications with other devices. For example, wired I/O interface 244 can provide a hardwired interface to other components, including sensors 152 and vehicle systems 158. Wired I/O interface 244 can communicate with other devices using Ethernet, CAN bus, or any of a number of other wired communication protocols whether standardized, proprietary, open, point-to-point, networked or otherwise.

Sensors 152 can include, for example, sensors 52 such as those described above with reference to the example of FIG. 1. Sensors 152 can include additional sensors that may or not otherwise be included on a standard vehicle 10 with which the adaptive mode system is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of assist-mode system 200.

Vehicle systems 158 can include any of a number of different vehicle components or subsystems used to control or monitor various aspects of the vehicle and its performance. In this example, the vehicle systems 158 include a GPS or other vehicle positioning system 272; torque vectoring system 274 that can control distribution of power among the vehicle wheels such as, for example, by controlling front/rear and left/right torque split; and or other vehicle systems 282.

Stored driving mode profiles 160 can include standard driving mode profiles 262 such as, for example, driving profiles preprogrammed at the factory for inclusion in vehicles. Stored driving mode profiles 160 can also include custom profiles such as, for example, custom settings selected by a user to create a custom driving profile. Stored driving mode profiles 160 can be retrieved and implemented in response to user input such as, for example user selection of a drive mode via drive mode selection actuator 245.

During operation, adaptive mode control circuit 210 can receive information from various vehicle sensors to determine whether a drive mode should be adapted. In an example implementation, information from vehicle sensors or vehicle systems can be used to determine that the vehicle is in a 4WD-LO, or crawl, mode. Accordingly, adaptive mode control circuit 210 can adjust one or more vehicle system settings that have been set in the current drive mode to adapt those settings to something more appropriate for the vehicle in 4WD-LO operation.

As yet another example, sensors may indicate a current environmental condition in which the vehicle is operating and the current environmental condition may warrant an adjustment of vehicle system settings to adapt the current drive mode to something more suitable for the current environmental condition. For example, if the vehicle is operating in a SPORT MODE, but this system determines that there is snow or ice on the ground or other low-traction environmental condition, adaptive mode control circuit 210 can adjust the throttle response or torque control to reduce the amount of torque that is applied to the drive wheels. As another example, adaptive mode control circuit 210 can adjust torque vectoring to adjust the torque split between front and rear wheels so that more power is sent to the front wheels.

Communication circuit 201 can be used to transmit and receive information between adaptive mode control circuit 210 and sensors 152, and adaptive mode control circuit 210 and vehicle systems 158. Also, sensors 152 may communicate with vehicle systems 158 directly or indirectly (e.g., via communication circuit 201 or otherwise). In various embodiments, communication circuit 201 can be configured to receive data and other information from sensors 152 that is used in determining whether it is appropriate to adapt a driving mode to a current situation. Additionally, communication circuit 201 can be used to send an activation signal or other activation information to various vehicle systems 158 as part engage in mode adaptation.

Figure 5:
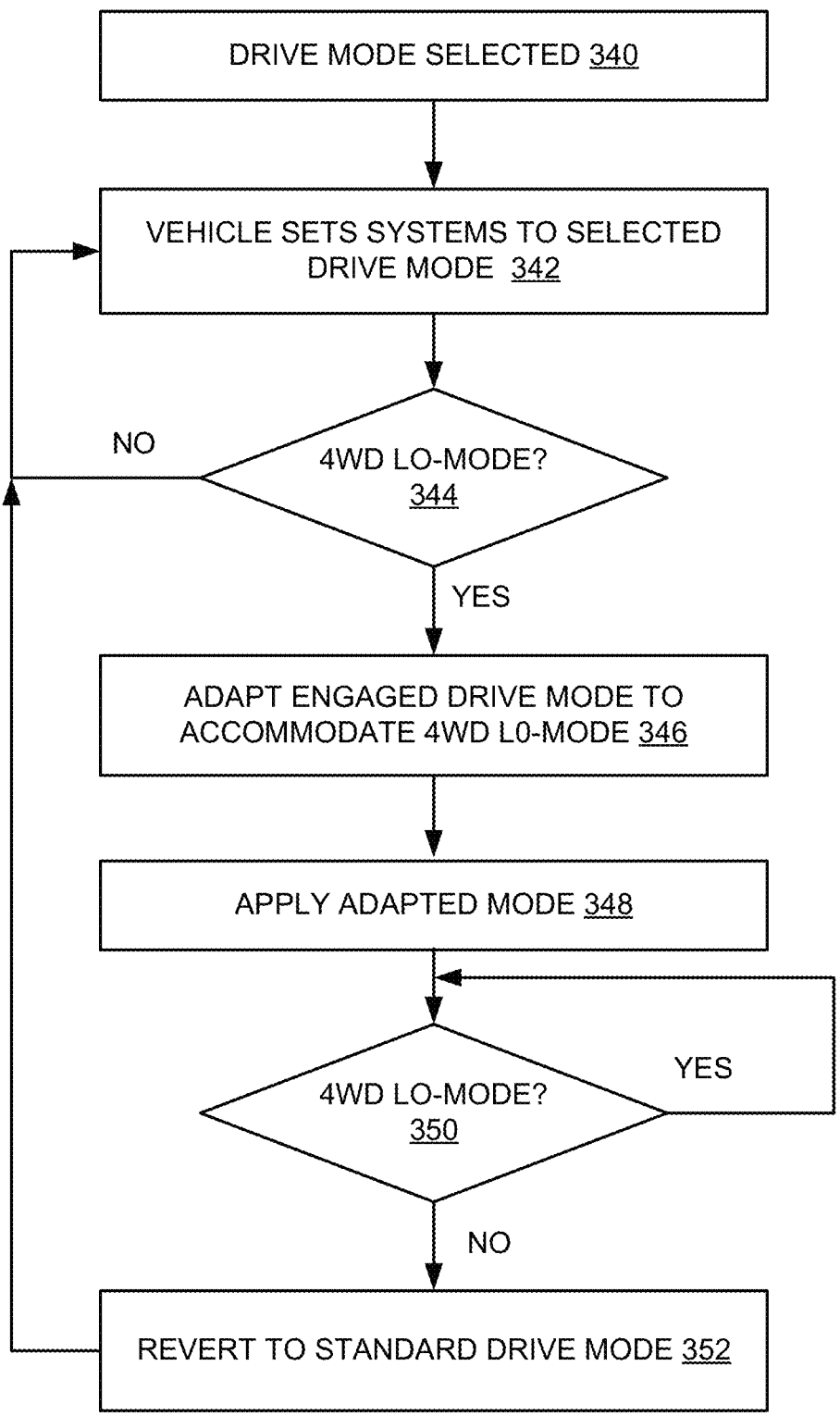
FIG. 5 illustrates an example process for engaging an adapted drive mode in accordance with one embodiment of the systems and methods described herein.
Figure 6:
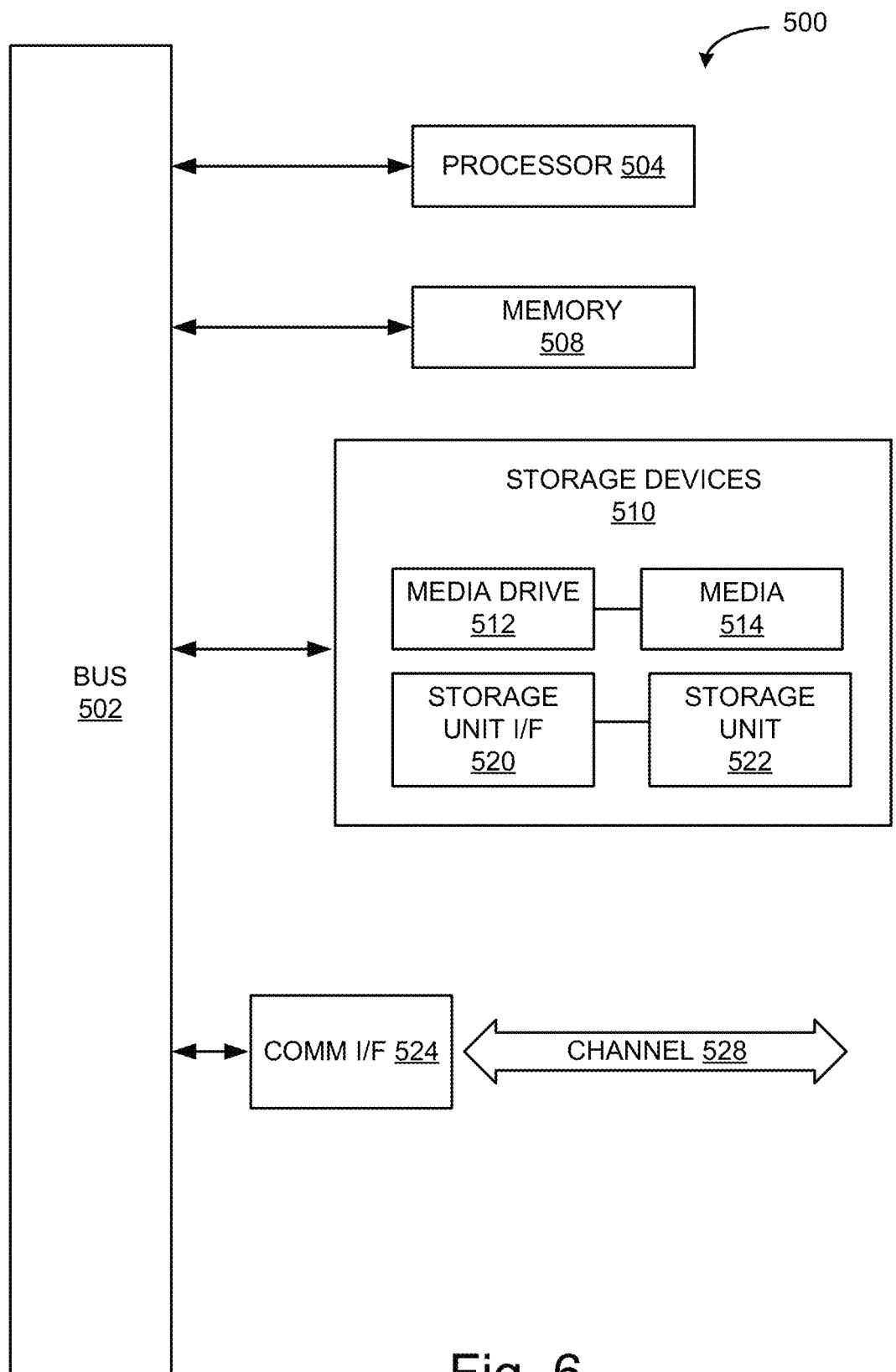
FIG. 6 is an example computing component that may be used to implement various features of embodiments described in the present disclosure.

FIG. 5 illustrates an example process for implementing mode adaptation in accordance with one embodiment. Referring now to FIG. 5, at operation 340 a drive mode is selected. For example, the drive mode can be selected by the vehicle at vehicle start up. As another example the vehicle operator may select the drive mode from one or more of a plurality of drive mode actuators such as a switch, button, knob, touchscreen or other user interface. The drive mode selected can be any of a plurality of drive modes such as, for example, a SPORT MODE, SPORT-PLUS MODE, COMFORT MODE, ECONOMY MODE, CUSTOM MODE or other mode.

At operation 342, the vehicle sets one or more systems (e.g., vehicle components or systems) to a setting that is appropriate for the selected drive mode. For example, in a SPORT MODE as compared to a COMFORT MODE, transmission shift points may be raised, throttle response may be heightened, adjustable suspension can be stiffened, steering assist can be reduced and so on. Accordingly, the vehicle makes these adjustments to set the vehicle to the drive mode that is selected at operation 340.

If the adaptive mode control system detects at operation 344 that the vehicle has been placed into a 4WD-LO mode, the process continues at operation 346 where the engaged drive mode is adapted to accommodate the 4WD-LO mode. For example, vehicle system settings (e.g., one or more of steering, suspension, throttle mapping, shift points, etc.) can be adjusted from the selected drive mode settings to provide a more appropriate vehicle response or driving experience given that the vehicle is now in the 4WD-LO mode. For example, if the vehicle is in SPORT MODE with a lowered ride height, the system may adapt the 4WD-LO mode so that the ride height is raised while the other SPORT MODE settings remain intact.

Another example of modifying a 4WD-LO mode may include adapting the throttle mapping to accommodate a lower transfer gear ratio to provide a smoother throttle response from the throttle to the drive wheels. In this case, the throttle may be calibrated to offer a smoother transition than a standard throttle calibration would offer. Another example that may implemented to accommodate the higher torque through the transfer case gear ratio can include a shift-change-calibration modification to make a smoother upshift or downshift event when in 4WD-LO than is currently offered.

If the system does not detect that the vehicle has been shifted into a 4WD-LO mode at operation 344, the process continues with vehicle settings remaining as set for the selected drive mode.

At operation 348, the adapted drive mode is applied to the vehicle to adjust vehicle system settings corresponding to the adapted drive mode. The vehicle makes these adjustments to set the vehicle to the drive mode that is selected as modified for 4WD-LO operation. The adaptation in the application of the adapted settings to the vehicle can be performed automatically by the adaptive mode control circuit without the need for user intervention.

At operation 350, as long as the vehicle continues to operate in the 4WD-LO, the vehicle can retain the settings. When the vehicle is shifted out of the 4WD-LO mode of operation, the system can revert to the standard settings for the previously selected drive mode. The system can be configured to perform this reversion automatically so that further user intervention is not required. This is illustrated operation 352.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An adaptive drive-mode system for a vehicle, comprising:
 a drive mode actuator to select a drive mode;
 a sensor to detect vehicle settings;
 a processor coupled to receive data from the sensor and the drive mode actuator; and a memory coupled to the processor to store instructions, which when executed by the processor, cause the processor to perform operations, the operations comprising:
  determining a selected drive mode by the drive mode actuator;
  using data from the sensor to determine whether the vehicle is in a low-range mode of operation; and
  modifying the selected drive mode to create an adapted drive mode if the vehicle is in low-range mode of operation, wherein the adapted drive mode modifies the selected drive mode by adjusting vehicle settings corresponding to the selected drive mode, with vehicle settings corresponding to the low-range mode of operation.

2. The adaptive drive-mode system of claim 1, wherein the drive mode actuator is a single-mode actuator to engage or disengage a single drive mode, wherein a single drive-mode assigned to the drive-mode actuator is selected by a vehicle user.

3. The adaptive drive-mode system of claim 2, wherein the drive mode assigned to the drive mode actuator is limited to use in the low-range mode, and further wherein the drive mode actuator is actuatable only when a vehicle transfer case is placed in the low-range mode.

4. The adaptive drive-mode system of claim 1, wherein the operations further comprise applying vehicle system settings corresponding to the adapted drive mode to the vehicle.

5. The adaptive drive-mode system of claim 1, wherein the operations further comprise upon sensing that the vehicle is removed from the low-range mode, automatically reapplying vehicle system settings corresponding to the selected drive mode.

6. The adaptive drive-mode system of claim 1, wherein the vehicle system settings are applied to adjust one or more of throttle mapping, suspension stiffness, shift points, shift speed, power steering boost and ride height.

7. An adaptive drive-mode system for a vehicle, comprising:
  a drive mode actuator to select a drive mode;
  a sensor to detect vehicle environment;
  a processor coupled to receive data from the sensor and the drive mode actuator; and
  a memory coupled to the processor to store instructions, which when executed by the processor, cause the processor to perform operations, the operations comprising:
    determining a selected drive mode by the drive mode actuator;
    using data from the sensor to determine an environmental condition in which the vehicle is operating; and
    modifying the selected drive mode to adapt vehicle settings corresponding to the selected drive mode of operation, wherein the adapted drive mode modifies the selected drive mode by adjusting vehicle settings corresponding to the selected drive mode, with vehicle settings corresponding to the determined environmental condition.

8. The adaptive drive-mode system of claim 7, wherein the operations further comprise applying vehicle system settings corresponding to the adapted drive mode to the vehicle.

9. The adaptive drive-mode system of claim 7, wherein the vehicle system settings are applied to adjust one or more of throttle mapping, suspension stiffness, shift points, shift speed, power steering boost and ride height.

10. A method for applying an adaptive drive-mode to a vehicle, the method comprising:
  the vehicle detecting a selected drive mode and setting vehicle systems to correspond to the selected drive mode to place the vehicle in the selected drive mode;
  an adaptive drive mode circuit using vehicle sensor data to determine whether the vehicle is in a low-range mode of operation; and
  modifying the vehicle system settings that correspond to the selected drive mode if the vehicle is in low-range mode, to adapt the vehicle system settings that correspond to the selected drive mode, for the low-range mode of operation.

11. The method of claim 10, wherein the drive mode is selected by a drive mode actuator that comprises a single-mode actuator to engage or disengage a single drive mode, wherein a single drive mode assigned to the drive mode actuator is selected by a vehicle user.

12. The method of claim 11, wherein a drive mode assigned to the drive mode actuator is limited to use in the low-range mode, and further wherein the drive mode actuator is actuatable only when a vehicle transfer case is placed in the low-range mode.

13. The method of claim 10, wherein the operations further comprise applying vehicle system settings corresponding to the adapted drive mode to the vehicle.

14. The method of claim 10, wherein the operations further comprise upon sensing that the vehicle is removed from the low-range mode automatically reapplying vehicle system settings corresponding to the selected drive mode.

15. The method of claim 10, wherein the vehicle system settings are applied to adjust one or more of throttle mapping, suspension stiffness, shift points, shift speed, power steering boost and ride height.

16. The method of claim 10 wherein the vehicle system settings are applied to adjust one or more of throttle mapping, suspension stiffness, shift points, shift speed, power steering boost and ride height.

17. A method for applying an adaptive drive: mode to a vehicle, the method comprising:
  detecting a selected drive mode and setting vehicle systems to correspond to the selected drive mode to place the vehicle in the selected drive mode;
  receiving sensor data;
  using the received sensor data from to determine an environmental condition in which the vehicle is operating; and
  modifying the drive mode selected by a drive mode actuator to adapt vehicle settings corresponding to the selected drive mode for operation in the determined environmental condition.

18. The method of claim 17, wherein the operations further comprise applying vehicle system settings corresponding to the adapted drive mode to the vehicle.

19. The method of claim 17, wherein the vehicle system settings are applied to adjust one or more of throttle mapping, suspension stiffness, shift points, shift speed, power steering boost and ride height.

* * * * *